United States Patent [19]
Matsushima et al.

[11] Patent Number: 5,706,482
[45] Date of Patent: Jan. 6, 1998

[54] MEMORY ACCESS CONTROLLER

[75] Inventors: Koh Matsushima; Yutaka Wakasu, both of Tokyo, Japan

[73] Assignee: NEC Corporation, Tokyo, Japan

[21] Appl. No.: 672,373

[22] Filed: May 29, 1996

[30] Foreign Application Priority Data

May 31, 1995 [JP] Japan ................................. 7-157169

[51] Int. Cl.$^6$ .................................................. G06F 13/16
[52] U.S. Cl. .......................... 396/521; 395/250; 395/427; 395/432; 395/516
[58] Field of Search .................................... 395/501, 509, 395/512, 516, 519, 521, 526, 427, 431, 432, 438, 309, 250

[56] References Cited

U.S. PATENT DOCUMENTS

| | | | |
|---|---|---|---|
| 5,473,577 | 12/1995 | Miyake et al. | 365/189.04 |
| 5,588,130 | 12/1996 | Fujishima et al. | 395/432 |
| 5,615,355 | 3/1997 | Wagner | 395/432 |

OTHER PUBLICATIONS

Japanese Provisional Publication No. 158852/'90.

*Primary Examiner*—Kee M. Tung
*Attorney, Agent, or Firm*—Laff, Whitesel, Conte & Saret, Ltd.

[57] ABSTRACT

In order to write data flowing in continuously into an image memory consisting of a single port RAM without lack and to read data out of the image memory continuously without lack in parallel, a memory access processor of the invention comprises;

- a write buffer for storing temporarily data flowing in continuously and outputting write requests while data are stored therein,
- a read buffer for storing temporarily data output from the image memory to be read out therefrom continuously, and
- an arbiter section for arbitrating concurrence between write requests and read requests for the image memory, writing data stored in the write buffer at a speed higher than a speed of data writing into the write buffer when write actions are performed according to the write requests, and reading data out of the image memory to be stored in the read buffer at a speed higher than a speed of data readout from the read buffer when read actions are performed according to the read requests.

7 Claims, 12 Drawing Sheets

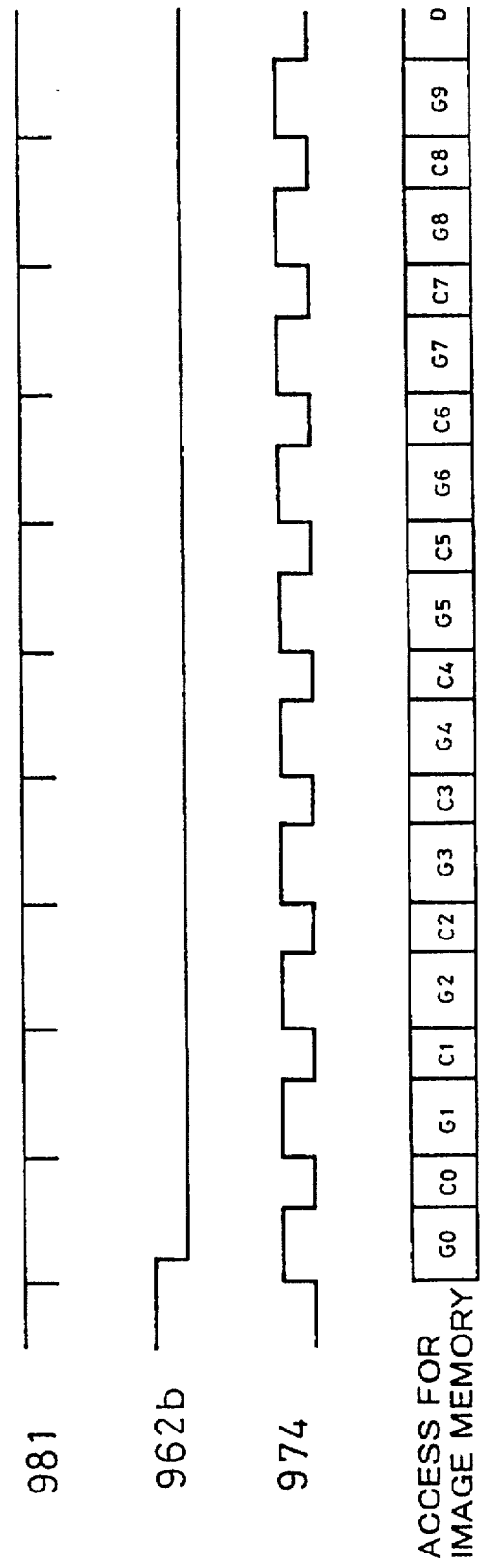

MEMORY ACCESS CONTROLLER

BACKGROUND OF THE INVENTION

This invention relates to a memory access controller used for access control of a single port RAM.

An arbitral control should be provided in a system where unsynchronous read and write requests are permitted for a single port RAM. When the single port RAM is a DRAM (Dynamic RAM), the arbitration must be performed also in consideration of their concurrence with requests for memory refreshment. In these cases, generally a priority is assigned to a request and other requests are forced to wait in prior arts as a memory access controller disclosed in a Japanese patent application laid open as a Provisional Publication No. 158852/'90, for example.

Therefore, a single port RAM could not be used in a system, where a read or a write request can not wait, such as a scan converter or an image capture for capturing a video image into a personal computer, wherein video data flowing in continuously should be recorded without lack in a memory and recorded data should be read out from the memory without intermission.

For the reason, dual port RAMs have been generally used in such a system. However, the dual port RAM is certainly expensive than the single port RAM.

This is a probrem.

SUMMARY OF THE INVENTION

Therefore, a primary object of the invention is to provide a memory access controller which can write data flowing in continuously even into a single port RAM without lack and read out stored data therefrom continuously without lack.

In order to achieve the object, a memory access controller of the present invention comprises:

an image memory consisting of a single port RAM;

a write buffer for storing temporarily data flowing in continuously and outputting write requests for said image memory when data are rest stored therein;

a read buffer for storing temporarily data output from said image memory to be read out therefrom continuously; and an arbiter section for arbitrating concurrence between said write requests from said write buffer and read requests for said image memory generated when data rest stored in said read buffer are lesser than a predetermined level, writing data stored in and read out of said write buffer into said image memory at a speed higher than a speed of data input into said write buffer when write actions for said image memory are performed according to said write requests, and reading a fixed volume of data to be stored in said read buffer out of said image memory at a speed higher than a speed of data readout from said read buffer when read actions for said image memory are performed according to said read requests.

Therefore, by setting the writing speed of data into the image memory and the reading speed of data out of the image memory at least two times of the writing speed of data into the write buffer and the reading speed of data out of the read buffer respectively, data flowing in continuously can be written in the image memory without lack and data stored in the image memory can be read out continuously without lack by the memory access controller of the invention, even when the image memory consists of a single port RAM.

BRIEF DESCRIPTION OF THE DRAWINGS

The foregoing, further objects, features, and advantages of this invention will become apparent from a consideration of the following description, the appended claims, and the accompanying drawings in which the same numerals indicate the same or the corresponding parts.

FIG. 12 is a time chart illustrating the arbitration between the write actions of the video data 962a into the image memory 902 and the read actions of the overlay data 976 of FIG. 9.

DETAILED DESCRIPTION OF THE PREFERRED EMBODIMENTS

Now, embodiments of the present invention will be described in connection with the drawings.

Figure 1:
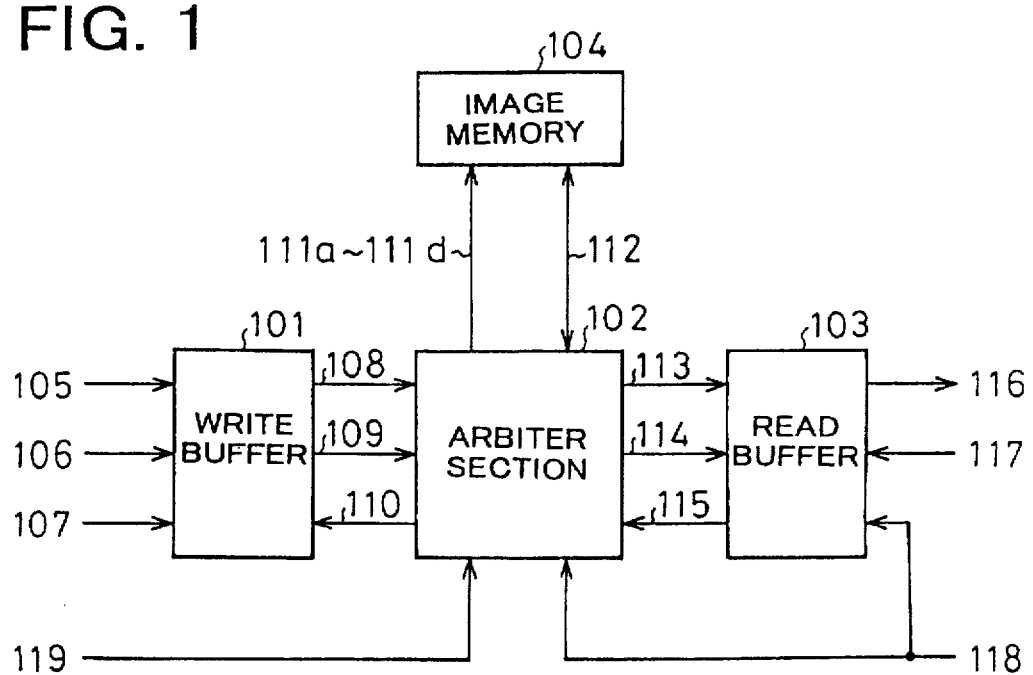
FIG. 1 is a block diagram of an embodiment of the invention.

FIG. 1 is a block diagram of an embodiment of the invention comprising a write buffer 101, an arbiter section 102, a read buffer 103 and an image memory 104 consisting of a single port DRAM. The write buffer 101 has a function for storing temporarily data flowing in from outside without intermission and sending write requests 109 to the arbiter section 102 when data are stored therein.

Here, the embodiment is described assuming that video data sampled from a video signal are input into the write buffer 101 as input data 105.

The read buffer 103 stores data read out of the image memory 104 temporarily, outputs read requests 115 to the arbiter section 102 for reading out a data set of certain words after a predetermined period T from a timing when a horizontal synchronous signal of a personal computer (not shown in the drawings) is delivered from the personal computer as an output synchronous signal 118, said read requests being repeated until fixed times on each occasion when storing data becomes less than a specified level, and outputs the data stored in the read buffer 103 one by one in accordance with data read signals 117 delivered from the personal computer. In the example, output data 116 of the read buffer 103 are presented on a display of the personal computer.

The arbiter section 102 arbitrates concurrence among the write requests 109 from the write buffer 101, the read requests 115 from the read buffer 103 and requests for memory refreshment, and when it operating in a write mode according to the write requests 109, it reads out data stored in the write buffer 101 for writing them into the image memory 104 with a speed faster than input speed of the input data 105, while reading out data sets of certain words from the image memory 104 for writing them into the read buffer 103 with a speed faster than output speed of data from the read buffer 103 when it is operating in a read mode according to the read requests 115, also refreshing the image memory 104 periodically.

Here, in the embodiment, the arbiter section 102 is prepared to regard a receipt of an output synchronous signal 118 as a request for memory refreshment at the same time. Therefore, the read request and the request for memory refreshment do not concur with each other and the concurrence between write and refresh requests and between read and write requests are sufficient to be considered in the embodiment.

Figure 2:
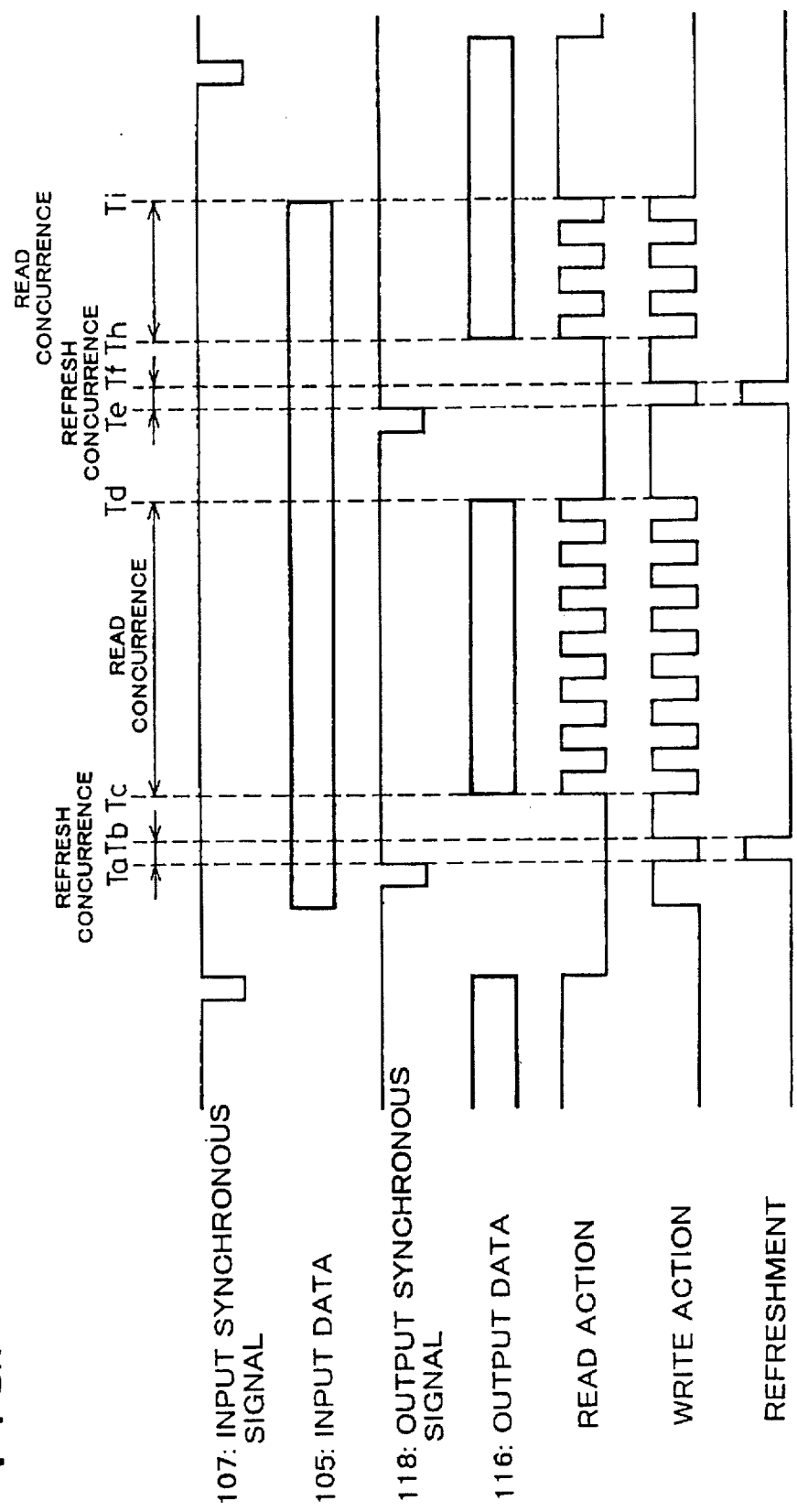
FIG. 2 is a timing chart illustrating arbitration performed in the embodiment of FIG. 1.

FIG. 2 is a timing chart illustrating arbitration performed in the embodiment of FIG. 1 among the read and write request and the refreshment of the image memory 104, wherein active signals are expressed with high levels.

In order to write input data 105 flowing in continuously for a period synchronized with an input synchronous signal 107, that is a horizontal synchronous signal of the video signal in the case, into the image memory 104 without lack, and in order to output, at the same time, the output data 116 from the read buffer 103 continuously synchronized with the output synchronous signal 118, read and write actions should be arbitrated not to concur with each other in time periods from Tc to Td and from Th to Ti, while write and refresh actions are to be arbitrated not to concur with each other in time periods from At to Tb and from Te to Tf, since refresh requests occur synchronized with the output synchronous signal 118.

Making the write and refresh actions not to concur with each other, the arbiter section 102 performs refreshment with priority and the write actions are performed after the refreshment is accomplished. When the write actions are performed, words of data stacked in the write buffer 101 during the refreshment period are read out and written in the image memory 104 with a speed faster than the input speed of the input data 105.

As for the concurrence between the write and read actions, the arbiter section 102 performs the read actions with priority and reads a data set of certain words out of the image memory 104 at a high-speed to write in the read buffer 103, and afterwards, words of data stacked in the write buffer 101 during the read actions are read out of the write buffer 101 to be written in the image memory 104 with a speed faster than the input speed of the input data 105.

Figure 3:
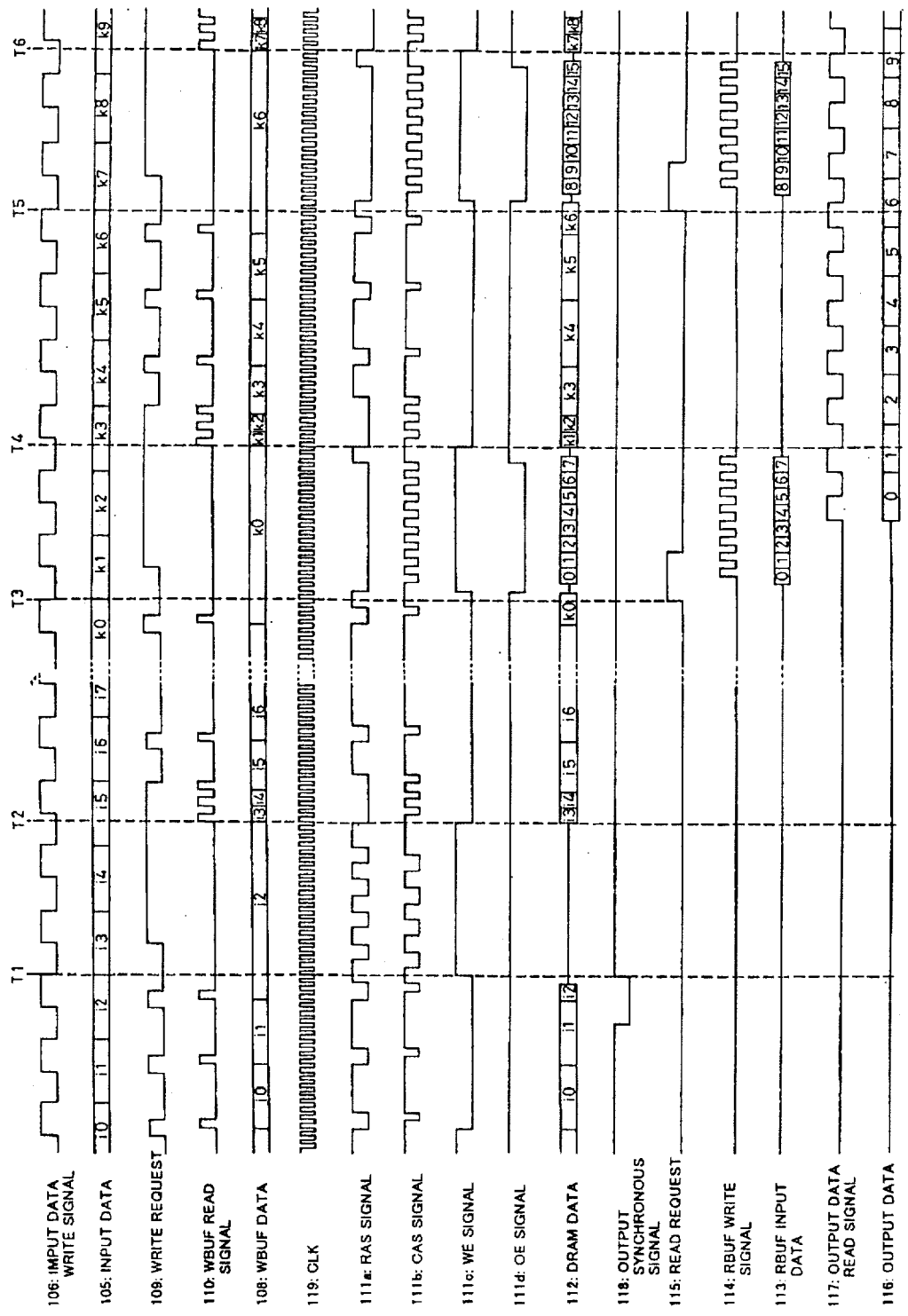
FIG. 3 is a timing chart illustrating detail operations of the embodiment of FIG. 1.

Now, referring to FIG. 3, detail operations of the embodiment of FIG. 1 are described.

Each word i0, i1, . . . flowing in consecutively as the input data 105 is captured in the write buffer 101 at each rising edge of an input data write signal 106.

In the write buffer 101, an internal counter (not expressed in the drawings) indicating a number of stacked words is incremented with every input word, and while the internal counter is indicating a value other than '0', the write buffer 101 continues to send write requests to the arbiter section 102 by making a write request signal 109 at high level.

Suppose the internal counter is incremented to '1' at a timing when a word i0 of the input data 105 is written in the write buffer 101.

According to the internal counter incremented to '1', the write buffer 101 requests a write action for the word i0 by shifting the write request signal 109 to high level. Then, at the timing, the arbiter section 102 shifts a WBUF (Write BUFer) read signal 110 for a period, since there is no read or write action in process.

The write buffer 101 outputs data of the word i0 stacked therein as WBUF data 108 synchronized with the rising edge of the WBUF read signal 110 and decrements the internal counter to '0', shifting the write request signal 109 at low level.

In the arbiter section 102, a RAS (Row Address Strobe) signal 111a and a WE (Write enable) signal 111c for the image memory 104 are shifted to low level at the rising edge of the WBUF read signal 110 and a CAS (Column Address Strobe) signal 111b is shifted to low level at the falling edge of the WBUF read signal 110, and the RAS and the CAS signals 111a and 111b are returned to high level at a following rising edge of a CLK (CLocK) signal 119. The arbiter section 102 also selects and outputs the data i0 to a DRAM data terminal 112 during the low level of the WE signal 111c.

In a write action of a single write mode above described, that is, mode for writing one word by one RAS and one CAS accesses, the data of a word i0 is written in the image memory 104.

Data i1 and i2 being input following the data i0, the same action is repeated for writing them in the image memory 104.

Afterwards, at a timing T1 when the output synchronous signal 118 rises up, it is considered as a refresh request by the arbiter section 102 and a refresh action is performed with a priority until a timing T2. Data i3 and i4 being input during the refresh period T1 to T2 are stacked in the write buffer 101.

In the refresh period T1 to T2, CAS before RAS refreshments are repeated four times ending at the timing T2, which is followed by another write action performed by the arbiter section 102. The write actions are performed in a high-speed page mode, mode for writing by shifting the CAS signal up and down consecutively maintaining the RAS signal at low level, since words of data i3 and i4 are stacked in the write buffer 104.

Even in a period when the data i3 and i4 are written in the image memory 104 in the high-speed page mode, data i5 is added onto the stack in the write buffer 101, so the arbiter section 102 performs three write actions consecutively in the high-speed page mode for writing the data i3, i4 and i5 in the image memory 104 as the result.

Here, number of write actions to be repeated in the high-speed page mode is to be determined according to input speed of the input data 105, writing speed in the high-speed page mode and time period for the refreshment.

In the embodiment, writing speed of the image memory 104 in the high-speed page mode is set to about five times of input speed of the input data 105.

Further, although four CAS before RAS refreshments are performed in a refresh period of the embodiment, apparently any type and times of refreshment action may be applied for the convenience of system.

Returning to FIG. 3, when a write action 109 is requested by the write buffer 101 wherein data i6 are stacked, the arbiter section 102 write the data i6 into the image memory 104 in the single write mode.

Then, at a timing T3 after a fixed time period T from the rising edge of the output synchronous signal 118, the read buffer 103 requests read actions by shifting a read request signal 115 at high level for a period.

With the read request signal 115 shifted to high level at the timing T3, the arbiter section 102 performs read actions ending at a timing T4 with a priority in reply to the read request signal 115. Here, these reading actions are performed in the high-speed page mode for reading a data set of eight words out of the image memory 104. At the same time, the arbiter section 102 outputs the data read out at high-speed sequentially as RBUF (Read BUFfer) input data 113 together with RBUF write signals 114. Here, in the embodiment, read out speed in the high-speed page mode from the image memory 104 is set about three times of the read out speed of the data from the read buffer 103.

The read buffer 103 stacks therein the RBUF input data 113 incrementing an internal counter thereof, at each rising edge of the RBUF write signals from the arbiter section 102.

At a timing when four words of data are stacked in the read buffer 103, output data read signals 117 begin to arrive from the personal computer and the read buffer 103 outputs data stacked therein as the output data 116 at each rising edge of the output data read signal 117, decrementing the internal counter thereof.

When the indication of the internal counter becomes below three at a timing T5, the read buffer 103 returns the read request signal 115 to high level in a period for requesting the arbiter section 102 to read a data set of another eight words out of the image memory 104 to be written therein in the same way. The arbiter section 102 repeats these read actions until data needed for a horizontal sweep are all read out.

By the way, data k1 and k2, which are input during the time period T3 to T4 when read actions are performed, are stacked in the write buffer 101 to be written into the image memory 104 at high-speed after the read actions from the image memory 104 are finished at the timing T4 by three write actions performed in the high-speed page mode by the arbiter section 102 together with data k3 input after beginning of the write actions.

Thus, in the embodiment comprising a write buffer 101, a read buffer 103 and an arbiter section 102 for reading stacked data out of the write buffer 101 in a high-speed page mode into an image memory 104, and writing data read out of the image memory 104 into the read buffer 103 also in the high-speed page mode, input data 105 flowing in continuously can be stored in the image memory 104 without a lack and the stored data therein can be read out of the image memory 104 continuously without a lack at the same time, even with the image memory 104 consisting of a single port RAM.

Furthermore, by applying ring buffers, the write buffer 101 and the read buffer 103 can be minimized to sizes of three words and six words respectively, enabling to be build in an IC as a gate array or a PAL (Programmable Array Logic).

In the embodiment, although a DRAM is applied for the image memory 104, an SRAM (Static RAM) too can be applied therein as a matter of course. In the case, an arbiter section 102 for arbitrating only the concurrence between read and write requests is sufficient to be applied.

Still further, the writing speed into the image memory 104 is set to about five times of that into the write buffer 101 and the reading speed out of the image memory 104 is set to about three times of that out of the read buffer 103 in the embodiment, but it is sufficient to set them at least two times of the writing or the reading speed for the write buffer 101 or the read buffer 103 for writing data flowing in continuously into the image memory 104 without lack and reading data continuously without lack therefrom.

Figure 4:
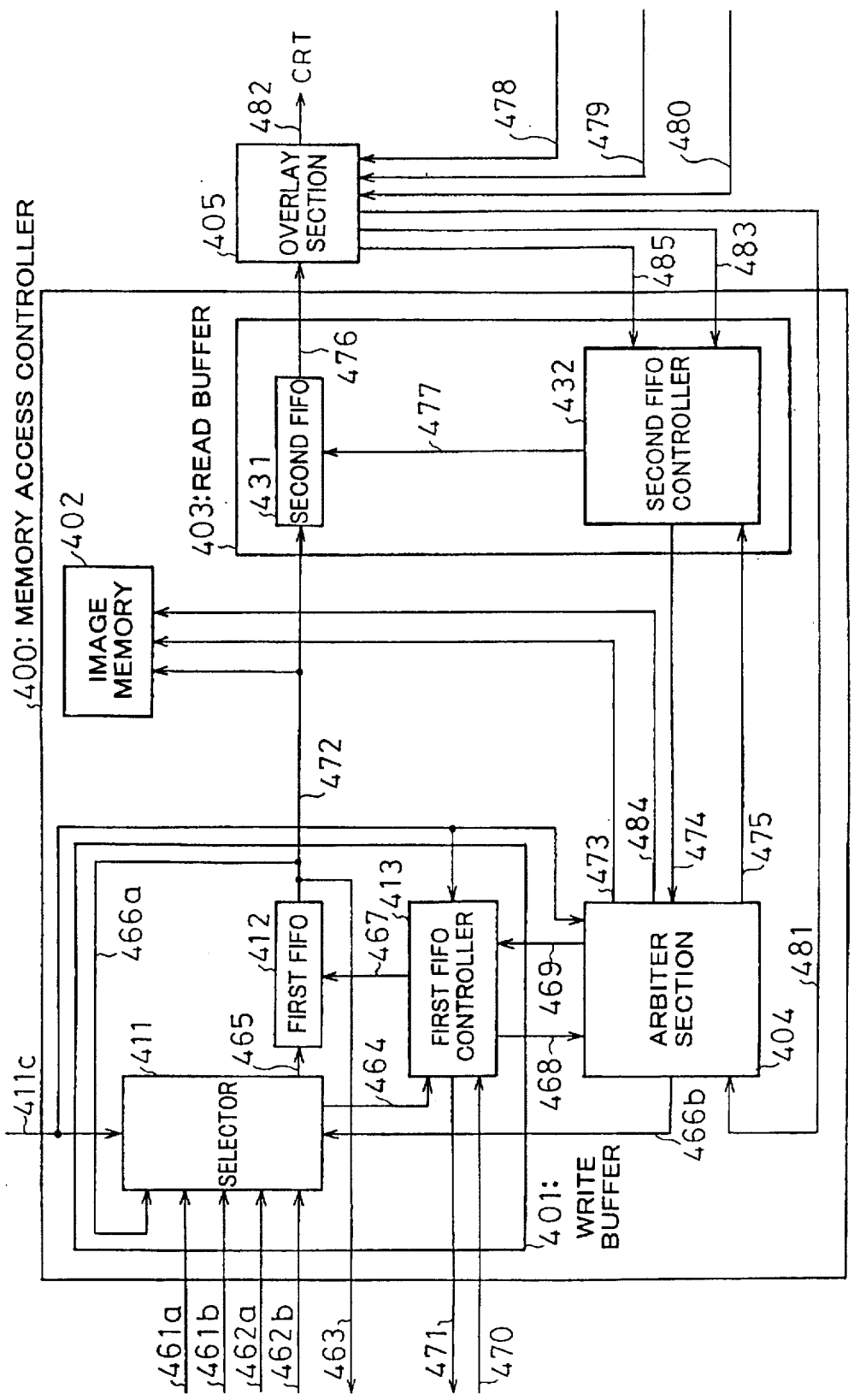
FIG. 4 is a block diagram illustrating another embodiment of the invention.

Another embodiment of the invention is illustrated in FIG. 4, which is composed of a memory access controller 400 and an overlay section 405.

The memory access controller 400 has a write buffer 401, an image memory 402, a read buffer 403 and an arbiter section 404.

The write buffer 401 comprises a selector 411, a first FIFO (First In First Out) 412 and a first FIFO controller 413.

The selector 411 selects a pair out of three pairs, a pair of data 461a from a personal computer (not shown in the drawings) and their write request signal 461b, a pair of video data 462a from a sampling circuit for sampling a video signal and their write request signal 462b, and a pair of data 466a read out of the image memory 402 and their write request signal 466b, indicated by a select signal 411c for outputting the data of the selected pair into the first FIFO 412 and the write request signal thereof to the first FIFO controller 413.

The first FIFO 412 is used for bufferring a difference between operating clock frequencies of the video data or the I/O of the personal computer and the arbiter section 404, and used also for bufferring the video data 462a or the data 461a from the personal computer flowing in while the arbiter section 404 is reading data to be written into the read buffer 403 out of the image memory 402.

The first FIFO controller 413 is provided for controlling read and write actions of the first FIFO 412 and generating an image memory access request signal 468 to be delivered to the arbiter section 404.

In the read buffer 403, there are provided a second FIFO 431 and a second FIFO controller 432.

The second FIFO 431 is used for buffering a difference between data input speed and data reading speed for the read buffer 403.

The second FIFO controller 432 is provided for controlling write actions for data read out of the image memory 402 into the second FIFO 431, controlling read actions out of the second FIFO according to a data read signal 485 delivered from the overlay section 405 and generating a memory access request signal 474 to be delivered to the arbiter section 404.

The arbiter section 404 performs write and read actions and refreshment for the image memory 402 arbitrating concurrence among image memory access requests 468 from the write buffer 401, those 474 from the read buffer 403, and requests for refreshment of the image memory 402.

Figure 5:
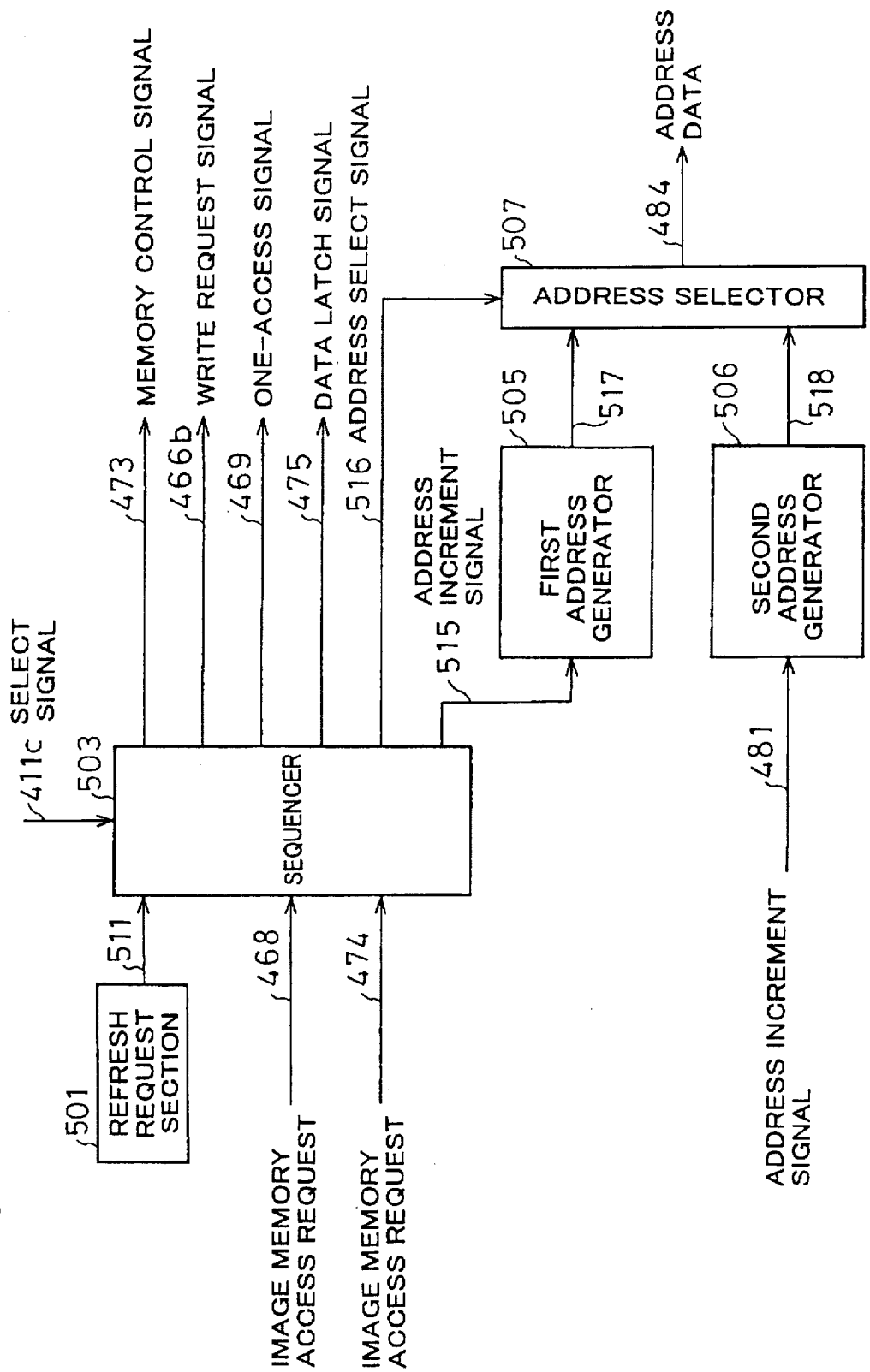
FIG. 5 shows an example of configuration of the arbiter section 404 of FIG. 4.

FIG. 5 shows an example of configuration of the arbiter section 404, wherein are comprised a refresh request section 501, a sequencer 503, a first address generator 505, a second address generator 506 and an address selector 507.

The refresh request section 501 outputs refresh requests 511 periodically by a fixed interval for refreshment of the image memory 402. Here, in the embodiment, it should be noted that the intervals of the refresh requests 511 are set with a sufficient ease for data stored in the image memory 402 not to evaporate if a refreshment does not directly follow the request thereof.

The first address generator 505 generates address data 517 used for accessing the image memory 402 according to the image memory access request 468 from the write buffer 401, while the second address generator 506 generates addresses 518 used for accessing the image memory 402 according to the image memory access request 474 from the read buffer 403.

The address selector 507 selects and outputs either of the address data 517 and 518 generated by the first and the second address generators respectively, controlled by an address select signal 516 delivered from the sequencer 503.

The sequencer 503 arbitrates concurrence among refresh requests. 511 from the refresh request section 501, the image memory access requests 468 from the write buffer 401 and the image memory access requests 474 from the read buffer 403; prepares a memory control signal 473 for the image memory 403; and outputs a one-access signal 469 to the write buffer 403, a data latch signal 475 to the read buffer 403, an address increment signal 515 to the first address generator, and the address select signal 516 to the address selector 507.

Here, when the sequencer 503 arbitrates concurrence among refresh requests 511 from the refresh request section 501, the image memory access requests 468 from the write buffer 401 and the image memory access requests 474 from the read buffer 403, priorities are determined as described in the following items, according to whether the write buffer 401 is used for writing the video data 462a into the image memory 402, or it is used for carrying out accesses from the personal computer, that is, accesses for writing data 461a from the personal computer into the image memory 402 or accesses for outputting data stored in the image memory 402 to the personal computer.

1. In case the write buffer 401 is used for writing the video data 462a into the image memory 402:

a first priority is assigned for the image memory access requests 474 from the read buffer 403, a second and a third priorities assigned for the image memory access requests 468 from the write buffer 401 and for the refresh requests 511 respectively.

In the case, the image memory access requests 468 from the write buffer 401 are those for writing the video data 462a.

2. In case the write buffer 401 is used for carrying out accesses from the personal computer:

the first priority is still assigned for the image memory access requests 474 from the read buffer 403, but the second priority is assigned for the refresh requests 511 and the third priority for the image memory access requests 468 from the write buffer 401.

Here, in the case, the image memory access requests 468 from the write buffer 401 are those for writing the data 461a when the write buffer 401 is used for writing the data 461a from the personal computer into the image memory 402 while they become requests for reading when it is used for outputting the data 463 to the personal computer.

Following is the reason why the priorities are assigned differently according to whether the write buffer 401 is used for writing the video data 462a into the image memory 402 or it is used for carrying out accesses from the personal computer.

When the write buffer 401 is used for carrying out accesses from a personal computer, even if the first FIFO 412 is fulfilled with the data 461a from the personal computer by assigning priority to the refresh requests 511, the personal computer can be controlled to wait for data not to lack, while the video data 462a can not wait and they would lack by overflowing out of the first FIFO 412, if the priority were assigned to the refresh requests 511 when the write buffer 401 is used for writing the video data 462a into the image memory 402. This is the reason.

The overlay section 405 synthesizes display data 478 delivered from the personal computer and data maintained in the second FIFO 431 for outputting to a display (not shown in the drawings) as synthesized data 482, synchronized with vertical and horizontal synchronous signals 479 and 480 of the personal computer.

Now, operation of the embodiment is described.

The embodiment operates in three modes, a video data synthesize mode for synthesizing and displaying the video data 462a and the display data 478 of the personal computer, a computer data synthesize mode for synthesizing and displaying the data 461a from the personal computer and the display data 478 of the personal computer, and a video data capture mode for synthesizing and displaying the video data 462a and the display data 478 of the personal computer and capturing the video data 462a at the same time in the personal computer.

Operation in the video data synthesize mode is described for the first.

In the video data synthesize mode, the select signal 411c indicating to select the pair of video data 462a and their write request signal 462b, the selector 411 outputs the video data 462a flowing in word by word to the first FIFO 412 and relays the write request signal 462b synchronous to the video data 462a to the first FIFO controller 413 as a write request signal 464.

When the write request signal 464 is delivered, the first FIFO controller 413 generates a FIFO control signal 467 for writing a word of the video data 462a in the first FIFO 412 incrementing a FIFO write address counter (not shown in the drawings) provided in the first FIFO controller 413. The first FIFO controller 413 also continues to output the image memory access requests 468 to the arbiter section 404 for demanding write action while there are data rest in the first FIFO 412 on condition that the select signal 411c is indicating to select the pair of video data 462a and their write request signal 462b. Here, the existence of data in the first FIFO 412 is detected from a FIFO read address counter (not shown in the drawings) provided in the first FIFO controller 413 and the FIFO write address counter.

When an image memory access request 468 for demanding a write actions delivered from the first FIFO controller 413, the sequencer 503 in the arbiter section 404 outputs the memory control signal 473 for indicating data writing to the image memory 402 together with an address data 484 (that is, the address data 517 generated by the first address generator 505 in the case) and outputs also a one-access signal 469 to the first FIFO controller 413. Here, when read actions are performed of the image memory 402, the write action above described is performed after a sequence of the read actions is finished.

Receiving a one-access signal 469 from the arbiter section 404, the first FIFO controller 413 generates a FIFO control signal 467 for reading a word of data 472 out of the first FIFO 412 and increments the FIFO read address counter therein afterwards. The word of data 472 read out of the first FIFO 412 is written into the image memory 402 controlled by the memory control signal 473 above described according to the address data 484.

Thus, a word of data 472 is written in the embodiment. Here, the sequencer 503 is designed to control signals such a way that the data 472 are written into the image memory 402 faster than the video data 462a written into the first FIFO 412. In the embodiment, the writing speed into the image memory 402 is designed two times of the writing speed into the first FIFO 412.

Then, the sequencer 503 delivers an address increment signal 515 to the first address generator 505 for preparing address for next data to be generated by the first address generator 505.

By repeating the operation for writing a word of data 472 as described, the sequencer 503 writes data rest in the first FIFO 412 into the image memory 402 at high-speed as long as the first FIFO controller 413 outputs the image memory access requests 468 for demanding write actions.

The data written into the image memory 402 as above described are to be read out as follows.

The overlay section 405 outputs a data read request 483 to the second FIFO controller 432 at a fixed timing in a cycle of the horizontal synchronous signal 480 of the personal computer and, at the same time, outputs an address increment signal 481 eight times consecutively. Here, a cycle of the address increment signals is set shorter than a cycle for reading data out of the second FIFO 431, a half for example.

Receiving the data read request 483 from the overlay section 405, the second FIFO controller 432 of the read buffer 403 generates an image memory access request 474 to the arbiter section 404.

When a image memory access request 474 is delivered from the read buffer 403, the sequencer 503 in the arbiter section 404 outputs the memory control signal 473 to the image memory 402 together with address data 484 (that is, the address data 518 generated by the second address generator 506, in the case) and the data latch signal 475 to the second FIFO controller 432. Here, it should be noted that the second address generator 506 generates eight addresses consecutively according to the eight consecutive address increment signals 481.

Thus, eight words of data are read out of the image memory 402 to be written into the second FIFO 431.

The overlay section 405 begins to output data read signals 485 after a fixed period of the data read request 483. Receiving every of the data read signals 485 from the overlay section 405, the second FIFO controller 432 delivers a FIFO control signal 477 for outputting overlay data 476 word by word from the second FIFO 431, which are synthesized with the display data 478 to be displayed as the synthesized data 482. The overlay section 405 again outputs the data read request 483 and the address increment signals 481 after reading certain words of data out of the second FIFO 431, that is, when number of words of data becomes smaller than a predetermined number. Thus, by repeating the same operation as described, eight words of data read out of the image memory 402 are written into the second FIFO 431 at high-speed and are read out thereof according to the data read signals 485 of the overlay section 405 to be synthesized at the overlay section 405 with the display data 478 from the personal computer to be displayed as the synthesized data 482.

The overlay section 405 repeats the operation until data needed for a horizontal sweep are all read out.

Now, operation in the computer data synthesize mode is described.

In the computer data synthesize mode, the select signal 411c indicating the pair of the data 461a from the personal computer and their write request signal 461b, the selector 411 outputs the data 461a word by word to the first FIFO 412 and relays their write request signal 461b synchronous to the data 461a to the first FIFO controller 413 as the write request signal 464.

When the write request signal 464 is delivered, the first FIFO controller 413 generates the FIFO control signal 467 for writing a word of the data 465 in the first FIFO 412 incrementing the FIFO write address counter provided in the first FIFO controller 413. The first FIFO controller 413 also continues to output the image memory access requests 468 to the arbiter section 404 for demanding write action while there are data rest in the first FIFO 412 on condition that the select signal 411c rest indicating to select the pair of data 461a and their write request signal 461b.

When the image memory access request 468 for demanding a write actions delivered from the first FIFO controller 413, the sequencer 503 in the arbiter section 404 writes data rest in the first FIFO 412 into the image memory 402 at a speed higher than that of data writing into the first FIFO 412, in the same way as beforehand described. When the first FIFO 412 is fulfilled in the mode, the first FIFO controller 413 dispatches a wait signal 471 to the personal computer outputting the data 461a for suspending them flowing in. Therefore, the data 461a are prevented to lack by overflowing out of the first FIFO 412, even when the first FIFO 412 is fulfilled by assigning priority to the requests for memory refreshment.

The data written into the image memory 402 are read out thereof in the same way too as beforehand described to be displayed as the synthesized data 482 after synthesized with the display data 478 at the overlay section 405.

Now, operation in the video data capture mode is described.

In the video data capture mode, the select signal 411c indicates to select the pair of video data 462a and their write request signal 462b while even fields of the video data 462a are flowing in, and to select the pair of the data 466a read out of the image memory 402 and their write request signal 466b delivered from the arbiter section 404 while odd fields of the video data 462a are flowing in.

When the select signal 411c is indicating the selection of the pair of video data 462a and their write request signal 462b, they are written into and read out of the image memory 402 in the same way as already described.

When the select signal 411c is indicating the selection of the pair of the data 466a read out of the image memory 402 and their write request signal 466b, the operation is performed as follows.

The read buffer 403 still performs the same operation as beforehand described even when the select signal 411c is indicating the selection of the pair of the data 466a read out of the image memory 402 and their write request signal 466b, but the overlay section 405 stops to output both of the data read request 483 and the data read signals 485.

The first FIFO controller 413 outputs read requests in turn as the image memory access requests 468 to the arbiter section 404, and continues to output the image memory access requests 468 until the first FIFO is 412 fulfilled when the select signal 411c is indicating the selection of the pair of the data 466a read out of the image memory 402 and their write request signal 466b. Here, whether the first FIFO 412 is fulfilled or not is determined from indications of the read address counter and the write address counter provided in the first FIFO controller 413.

When a read-request arrives from the first FIFO controller 413 as an image memory access request 468, the sequencer 503 of the arbiter section 404 outputs the memory control signal 473 for a read action to the image memory 402 together with address data 484. (the address data 517 output from the first address generator), and at the same time, the write request 466b to the selector 411, on condition that the image memory access request 468 does not concur with the image memory access request 474 from the read buffer 403. In case it concurs with an image memory access request 474, the operation described here is to be performed after the read actions for the image memory access request 474 are finished.

According to the memory control signal 473 and the address data 484 above described, a word of the data 466a is read out of the image memory 402 to be added into the first FIFO 412 through the selector 411. And, the write request 466b output from the sequencer 503 of the arbiter section 404 is delivered to the first FIFO controller 413 through the selector 411.

Receiving the write request 466b, the first FIFO controller 413 outputs a FIFO control signal 467 for writing a word of the data 466a arrived to the first FIFO 412 therein and increments the write address counter in the first FIFO controller 413.

While a period when the first FIFO controller 413 is outputting the image memory access requests 468 for read actions, the same operation is repeated and the data 466a are read word by word out of the image memory 402 to be stored in the first FIFO 412. And, when the first FIFO 412 is fulfilled, the first FIFO controller 413 stops to output the image memory access request 468.

When a desired video image is displayed on the display, a user, intending to capture the video data, indicates data capturing to the personal computer.

By the indication, the personal computer delivers a read request 470 periodically with a predetermined cycle, on condition that the select signal 411c is indicating the selection of the pair of the data 466a read out of the image memory 402 and their write request signal 466b.

With each read request 470, the first FIFO controller 413 in the write buffer 401 outputs a FIFO control signal 467 for reading out a word of the data 463 to be output to the personal computer. Here, when the select signal 411c is indicating the selection of the pair of video data 462a and there write request signal 462b, the first FIFO controller 413 dispatch the wait signal 471 to make the personal computer waiting.

Figure 6:
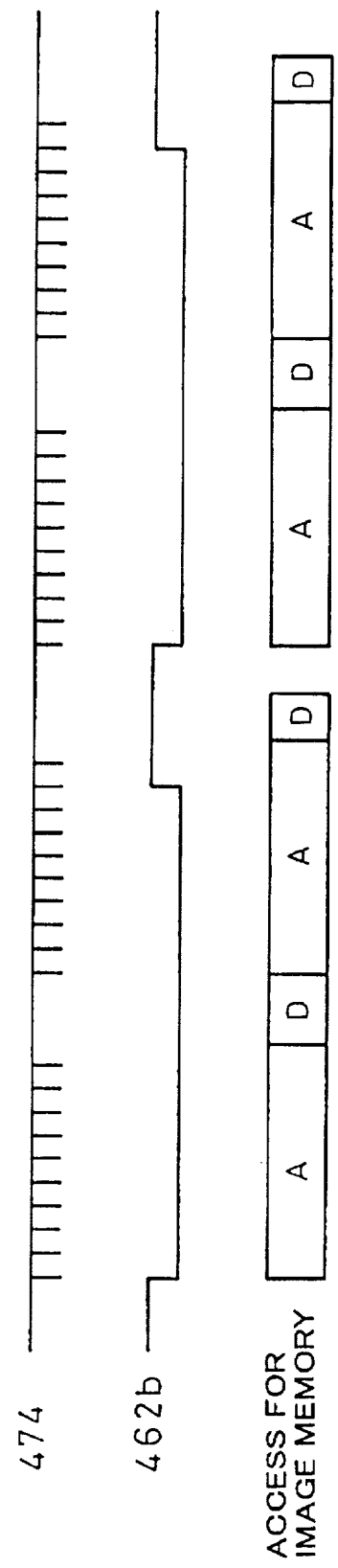
FIG. 6 is a timing chart illustrating the arbitration between the write actions of the video data 462a into the image memory 402 and the read actions of the overlay data 476 of FIG. 4.

FIG. 6 is a timing chart illustrating the arbitration between the write action of the video data 462a into the image memory 402 and the read action of the overlay data 476, wherein active states of the video data write request signal 462b and the image memory access request 474 from the second FIFO controller 432 are expressed by low levels. Periods denoted by 'A' represent time periods where concurrence between read actions for the overlay data 476 and write actions for the video data 462a is arbitrated, while only writing actions of the video data 462a are performed in periods denoted by 'D'.

Figure 7:
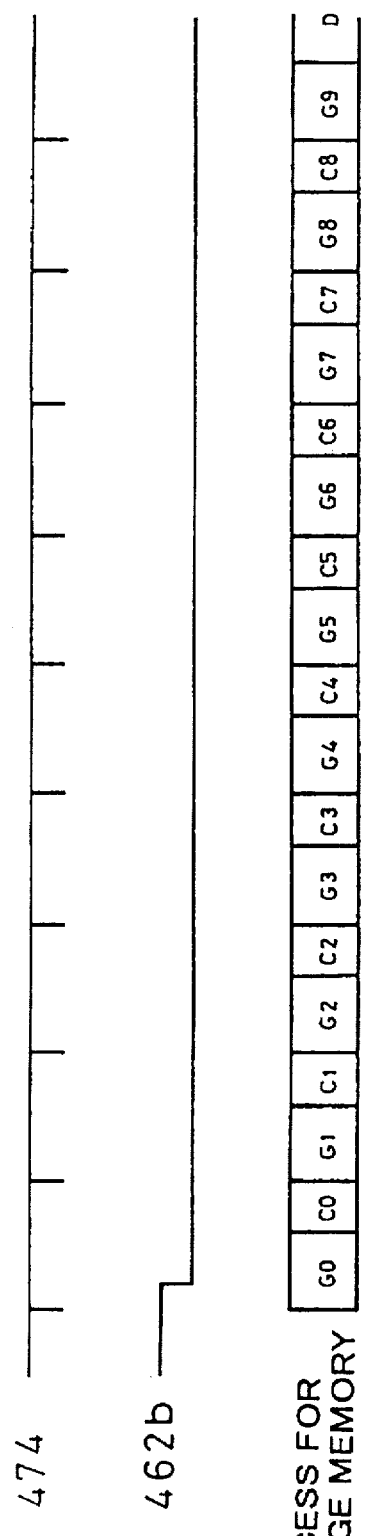
FIG. 7 is a timing chart illustrating developed details of a period 'A' of FIG. 6.

In FIG. 7, there are developed details of a period 'A' wherein concurrence between read actions for the overlay data 476 and write actions for the video data 462a is arbitrated, periods denoted by G0 to G9 representing periods assigned for read actions of the overlay data 476 and periods denoted by C0 to C8 representing periods assigned for write action of the video data 462a.

Figure 8:
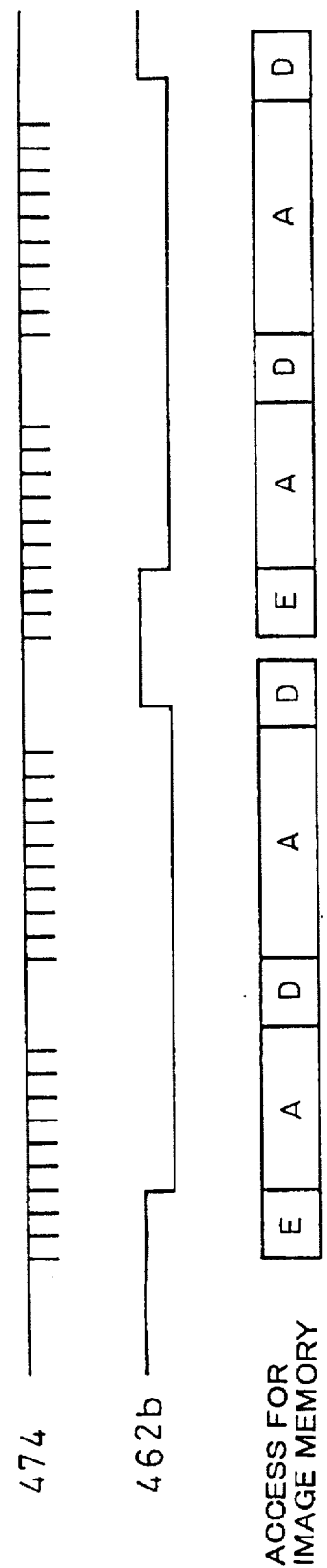
FIG. 8 is a timing chart illustrating another example of the arbitration between the write actions of the video data 462a into the image memory 402 and the read actions of the overlay data 476 of FIG. 4.

FIG. 8 is a timing chart illustrating another example of the arbitration between the write action of the video data 462a into the image memory 402 and the read action of the overlay data 476, wherein timings of write actions for the video data 462a and read actions for the overlay data 476 are modified from those of FIG. 6. Periods denoted by 'A', 'D' and 'E' in FIG. 8 represent periods where read actions for the overlay data 476 and write actions for the video data 462a are performed under the arbitration, periods where write actions for the video data 462a are performed exclusively and periods where only read actions for the overlay data 476 are performed, respectively.

Here, in the embodiment of FIG. 4, a DRAM is applied for the image memory 402. However an SRAM too can be applied therein as a matter of course. In the case, an arbiter section 402 for arbitrating only the concurrence between read and write requests is sufficient to be applied.

Figure 9:
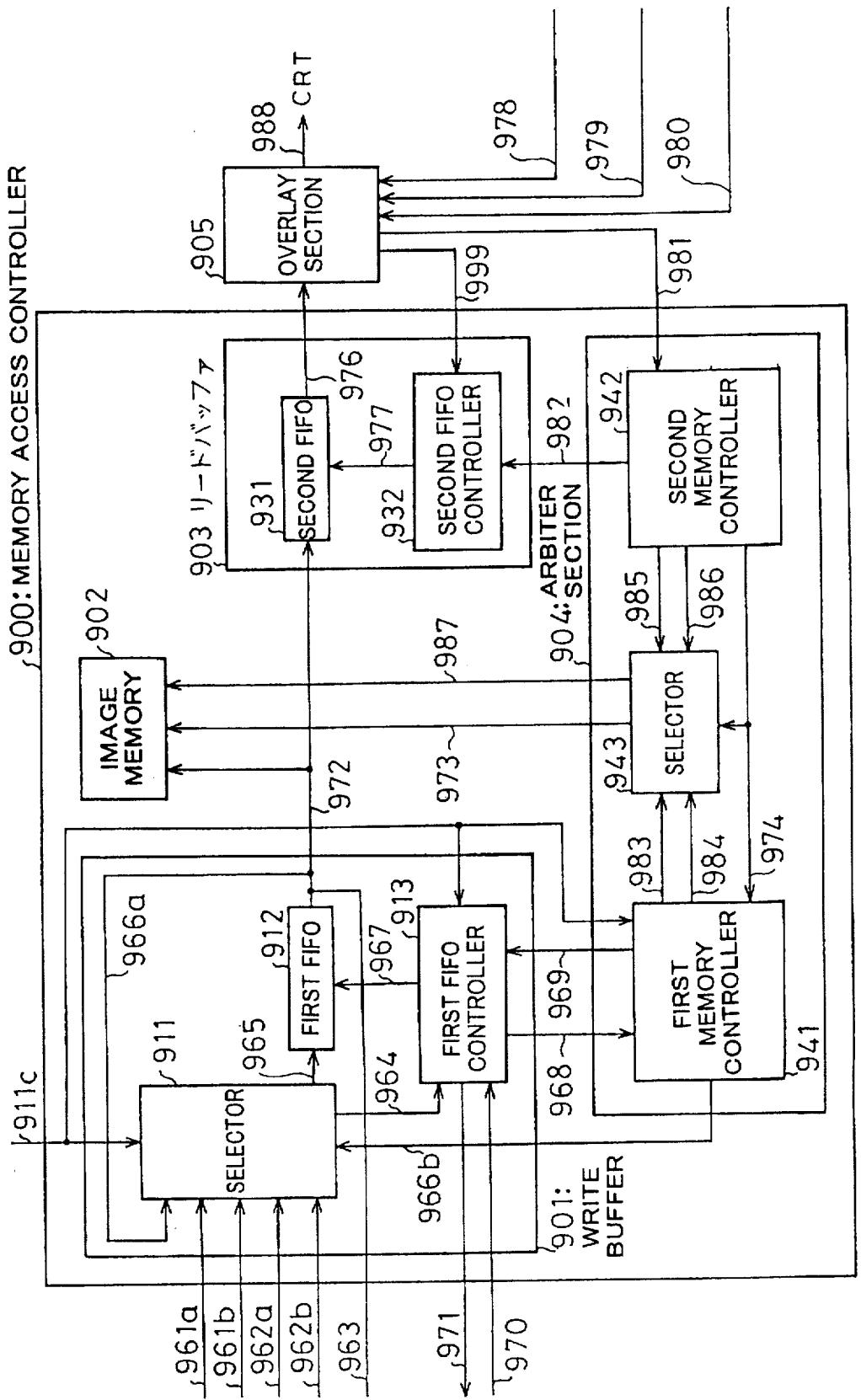
FIG. 9 is a block diagram of still another embodiment of the invention.

FIG. 9 is a block diagram of still another embodiment of the invention, composed of a memory access controller 900 and an overlay section 905.

The memory access controller 900 has a write buffer 901, an image memory 902 consisting of a DRAM, a read buffer 903 and an arbiter section 904.

The write buffer 901 comprises a selector 911, a first FIFO 912 and a first FIFO controller 913.

The selector 911 selects a pair out of three pairs, a pair of data 961a from a personal computer (not shown in the drawings) and their write request signal 961b, a pair of video data 962a from a sampling circuit for sampling a video signal and their write request signal 962b; and a pair of data 966a read out of the image memory 902 and their write request signal 966b, indicated by a select signal 911c for outputting the data of the selected pair into the first FIFO 912 and the write request signal thereof into the first FIFO controller 913.

The first FIFO 912 is used for buffering a difference between operating clock frequencies of the video data or the I/O of the personal computer and the arbiter section 904, and also used for bufferring the video data 962a or the data 961a from the personal computer flowing in while the arbiter section 904 is reading data to be written into the read buffer 903 out of the image memory 902.

The first FIFO controller 913 is provided for controlling read and write actions of the first FIFO 912 and generating image memory access request signals 968 to be delivered to the arbiter section 904.

In the read buffer 903, there are provided a second FIFO 931 and a second FIFO controller 932.

The second FIFO 931 is used for buffering a difference between data input speed and data reading speed for the read buffer 903.

The second FIFO controller 932 is provided for controlling a write actions of data read out of the image memory 902 into the second FIFO 931, and controlling read actions of data 976 out of the second FIFO 931.

In the arbiter section 904, there are provided a first memory controller 941, a second memory controller 942 and a selector 943.

The first memory controller 941 performs accesses to the image memory 902 in accordance with image memory access requests 968 from the first FIFO controller 967, only on condition that an image memory access permission signal 974 delivered from the second memory controller 942 is active.

The second memory controller 942 arbitrates concurrence between memory access requests from the overlay section 905 and the refresh requests, performs accesses to the image memory 902 according to the image memory access requests 981 or the refresh requests, and controls the image memory access permission signal to be delivered to the first memory controller 941.

The selector 943 selects a memory control signal 983 and address data 984 from the first memory controller 941 when the image memory access permission signal 974 is active, and otherwise, selects another memory control signal 985 and address data 986 from the second memory controller 942.

Figure 10:
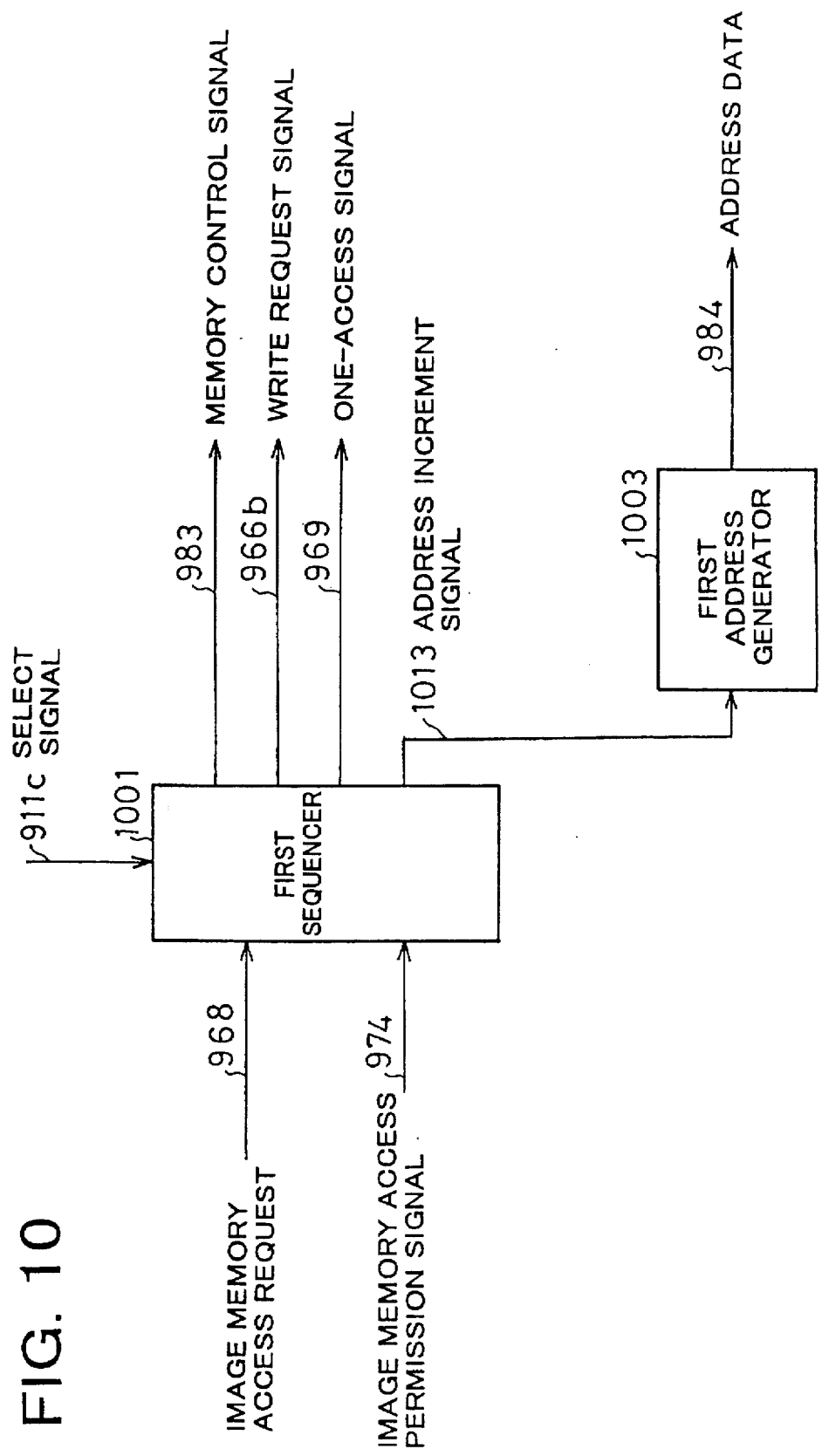
FIG. 10 is a block diagram illustrating an example of a configuration of the first memory controller 941 in the arbiter section 904 of FIG. 9.

FIG. 10 is a block diagram illustrating an example of a configuration of the first memory controller 941 in the arbiter section 904, wherein are provided a first sequencer 1001 and a first address generator 1003.

Only when the image memory access permission signal 974 is active, the first sequencer 1001 outputs a memory control signal 983 in accordance with each of the memory access requests 968 from the first FIFO controller 913, and outputs an address increment signal 1013 to the first address generator 1003 and a one-access signal 969 to the first FIFO controller 913 after each access to the image memory 902.

Figure 11:
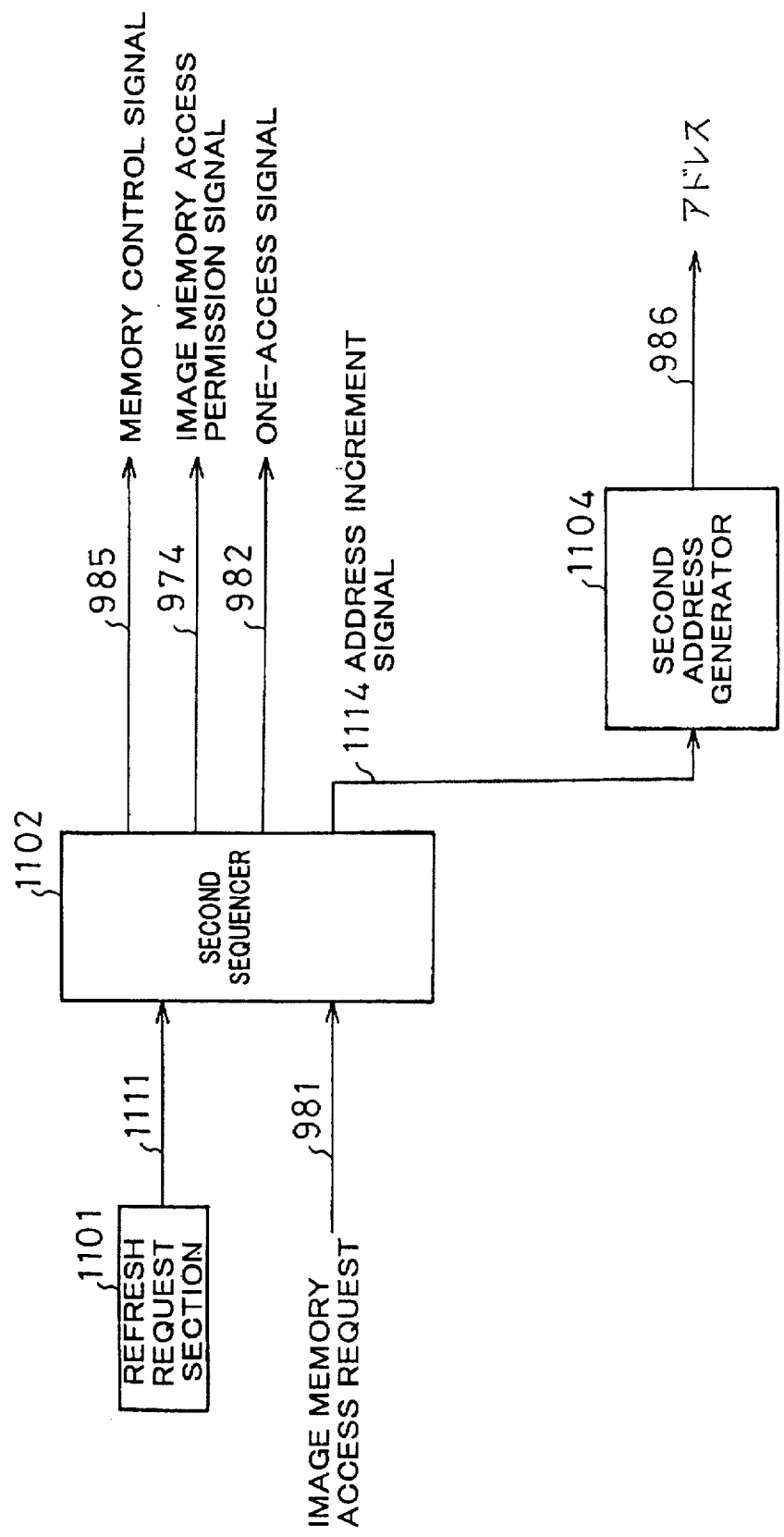
FIG. 11 is a block diagram illustrating an example of a configuration of the second memory controller 942 in the arbiter section 904 of FIG. 9.

FIG. 11 is a block diagram illustrating an example of a configuration of the second memory controller 942 in the arbiter section 904, wherein are provided a refresh request section 1101, a second sequencer 1102 and a second address generator 1104.

The refresh request section 1101 generates refresh requests 1111 at the end of every predetermined interval for memory refreshment of the image memory 902 consisting of DRAM.

The second sequencer 1102 outputs memory control signals 985 to the image memory 902 arbitrating concurrence between the refresh requests 1111 from the refresh request section 1101 and the memory access requests 981 from the overlay section 905, and also outputs an address increment signal 1114 to the second address generator 1104 and a one-access signal 982 to the second FIFO controller 932 after each access to the image memory 902.

Here, when the second sequencer 1102 arbitrates the concurrence between the refresh requests 1111 and the memory access requests 981, priorities are assigned to the memory access requests 981, and the second sequencer 1102 makes the image memory access permission signal 974 active only when there is no refresh request 1111 nor image memory access request 981. Therefore, priority assigned to the image memory access requests 974, which is valid only when the image memory access permission signal 974 is active, is inferior to the refresh request 1111, resulting in that a first priority is assigned for the image memory access requests 981 from the overlay section 905 followed by a second priority assigned to the refresh request 1111 and a third priority assigned for the memory access request 968 from the first FIFO controller 967, in the arbiter section 901.

The overlay section 905 synthesizes display data 978 from the personal computer and the data read out of the image memory 902 synchronized with a vertical and a horizontal signals of the personal computer to be displayed as synthesized data 988.

Operation of the embodiment will be described in the following paragraphs.

The embodiment operates in three modes, a video data synthesize mode for synthesizing and displaying the video data 962a and the display data 978 of the personal computer, a computer data synthesize mode for synthesizing and displaying the data 961a from the personal computer and the display data 978 of the personal computer, and a video data capture mode for synthesizing and displaying the video data 962a and the display data 978 of the personal computer and capturing the video data 962a at the same time into the personal computer.

Operation in the video data synthesize mode is described for the first.

In the video data synthesize mode, the select signal 911c indicating to select the pair of video data 962a and their write request signal 962b, the selector 911 outputs the video data 962a flowing in word by word to the first FIFO 912 and relays the write request signal 962b synchronous to the video data 962a to the first FIFO controller 913 as a write request signal 964.

When the write request signal 964 is delivered, the first FIFO controller 913 generates a FIFO control signal 967 for writing a word of the video data 962a in the first FIFO 912 incrementing a FIFO write address counter (not shown in the drawings) provided in the first FIFO controller 913. The first FIFO controller 913 continues to output the image memory access requests 968 for demanding write actions while there are data rest in the first FIFO 912 on condition that the select signal 911c rest indicating to select the pair of video data 962a and their write request signal 962b.

When an image memory access request 968 for demanding a write action is delivered from the first FIFO controller 913, the first sequencer 1001 in the first memory controller 941 of the arbiter section 904 outputs the memory control signal 983 for indicating data writing to the image memory 902 together with a one-access signal 969 to the first FIFO controller 913.

Here, while the image memory access permission signal 974 is inactive, the operation above described is made waiting and performed after it turns active.

The memory control signal 983 from the first sequencer 1001 is delivered to the image memory 902 through the selector 943, and at the same time, also the address data 984 generated by the first address generator 1003 is delivered to the image memory 902 through the selector 943.

Receiving the one-access signal 969 from the sequencer 1001, the first FIFO controller 913 outputs the FIFO control signal 967 for reading out a word of the data 972 and increments the FIFO read address counter therein, a word of the data 972 being written into the image memory 902 according to the memory control signal 983 and the address 984.

Thus, a word of the data 972 is written into the image memory 902. Here, the sequencer 1001 is prepared to control each signal so that the data set 972 is written into the image memory 902 faster than the video data 962a written into the first FIFO 912. In the embodiment, the writing speed into the image memory 902 is set twice of the writing speed into the first FIFO 912.

Then, the sequencer 1001 outputs an address increment signal 1013 to the first address generator 1003 for setting the address 984 to indicate the address of the image memory 902 for the next access.

By repeating the operation above described according to the image memory access requests 968 from the first FIFO controller 913, data stored in the first FIFO 912 are written into the image memory 902 at high-speed.

The data written in the image memory 902 as heretofore described are to be read out as follows.

The overlay section 905 outputs a memory access request 981 to the second memory controller 942 in the arbiter section 904 for demanding a data readout from the image memory 902, at a fixed timing in a cycle of the horizontal synchronous signal 980 of the personal computer.

Receiving the memory access request 981 from the overlay section 905, the second sequencer 1102 in the second memory controller 942 outputs a memory control signal 985 for indicating a read action to the image memory 902, makes inactive the image memory access permission signal 974 to the first memory controller 941, and outputs an address increment signal 1114 eight times consecutively. Here, a cycle of the address increment signals 1114 is set shorter than a cycle for reading data out of the second FIFO 931, a half for example, and the second sequencer 1102 outputs a one-access signal 982 to the second FIFO controller 932 after every one word access to the image memory 902, that is, after every one word is read out.

The memory control signal 985 and the address data 986 from the second sequencer 1102 are delivered to the image memory 902 as a memory control signal 973 and addresses 987 selected by the selector 943, according to which eight words of data are read out of the image memory 902 at high-speed.

The second FIFO controller 932 in the read buffer 903 outputs FIFO control signals 977 according to the one-access signal 982 for writing eight words of data from the image memory 902 into the second FIFO 931 word by word.

Then, the overlay section 905 begins to output data read signals 999. Receiving each of the data read signals 999 from the overlay section 905, the second FIFO controller 932 delivers a FIFO control signal 977 for outputting data from the second FIFO 931 word by word, which are synthesized with the display data 978 of the personal computer to be displayed as synthesized data 988. The overlay section 905 again outputs the image memory access request 981 after reading certain words of data out of the second FIFO 931, that is, when number of words of data rest therein becomes smaller than a predetermined number. Thus, by repeating the same operation as described, eight words of the data read out of the image memory 902 are written into the second FIFO 931 at high-speed and are read out thereof according to the data read signals 999 of the overlay section 905 to be synthesized at the overlay section 905 with the display data 978 from the personal computer to be displayed as the synthesized data 988.

The overlay section 905 repeats the operation until data needed for a horizontal sweep are all read out.

Now, operation in the computer data synthesize mode is described.

In the computer data synthesize mode, the select signal 911c indicating the pair of the data 961a from the personal computer and their write request signal 961b, the selector 911 outputs the data 961a word by word to the first FIFO 912 and relays their write request signal 961b synchronous to the data 961a to the first FIFO controller 913 as the write request signal 964.

When the write request signal 964 is delivered, the first FIFO controller 913 generates the FIFO control signal 967 for writing a word of the data 961a in the first FIFO 912 incrementing the FIFO write address counter (not shown in the drawings) provided in the first FIFO controller 913.

The first FIFO controller 913 also continues to output the image memory access requests 968 to the arbiter section 904 for demanding write action while there are data rest in the first FIFO 912 on condition that the select signal 911c rest indicating to select the pair of data 961a and their write request signal 961b.

When the image memory access request 968 for demanding a write actions delivered from the first FIFO controller 913, the sequencer 1001 in the first memory controller 941 of the arbiter section 904 writes data maintained in the first FIFO 912 into the image memory 902 at a speed higher than that of data writing into the first FIFO 912. When the first FIFO 912 is fulfilled in the mode, the first FIFO controller 913 dispatches a wait signal 971 to the personal computer outputting the data 461a for suspending them flowing in.

The data written into the image memory 902 are read out thereof in the same way too as beforehand described to be displayed as the synthesized data 988 after synthesized with the display data 978 at the overlay section 905.

Now, operation in the video data capture mode is described.

In the video data capture mode, the select signal 911c indicates to select the pair of video data 962a and their write request signal 962b while even fields of the video data 962a are flowing in, and to select the pair of the data 966a read out of the image memory 902 and their write request signal 966b delivered from the arbiter section 904 while odd fields of the video data 962a are flowing in.

When the select signal 911c is indicating the selection of the pair of video data 962a and their write request signal 962b, they are written into and read out of the image memory 902 and synthesized with the display data 978 in the overlay section 905 for displaying in the same way as already described.

When the select signal 911c is indicating the selection of the pair of the data 966a read out of the image memory 902 and their write request signal 966b, the operation is performed as follows.

The read buffer 903 still performs the same operation as beforehand described even when the select signal 911c is indicating the selection of the pair of the data 966a read out of the image memory 902 and their write request signal 966b, but the overlay section 905 stops to output both of the image memory access request 981 and the data read signals 999.

The first FIFO controller 913 outputs read requests in turn as the image memory access requests 968 to the first memory controller 941 in the arbiter section 904, and continues to output the image memory access requests 968 until the first FIFO 912 is fulfilled when the select signal 911c is indicating the selection of the pair of the data 966a read out of the image memory 902 and their write request signal 966b.

When a read request arrives from the first FIFO controller 913 as an image memory access request 968, the first sequencer 1001 in the first memory controller 941 of the arbiter section 904 outputs the memory control signal 983 indicating a read action to the image memory 902, and at the same time, the write request 966b to the selector 911, on condition that the image memory access permission signal 974 from the second memory controller 942 is active. In case the image memory access permission signal is inactive, the operation described here is to be performed after it turns active.

The memory control signal 983 from the first sequencer 1001 in the first memory controller 941 and the address data 984 generated by the first address generator 1003 are delivered to the image memory 902 selected by the selector 943 as the memory control signal 973 and the addresses 987.

According to the memory control signal 983 and the address data 984 above described, a word of the data 966a is read out of the image memory 902 to be added into the first FIFO 912 through the selector 911. And, the write request 966b output from the first sequencer 1001 is delivered to the first FIFO controller 913 through the selector 911.

Receiving the write request 966b, the first FIFO controller 913 outputs a FIFO control signal 967 for writing a word of the data 966a arrived to the first FIFO 912 therein and increments the write address counter in the first FIFO controller 913.

While a period when the first FIFO controller 913 is outputting the image memory access requests 968 for data readout, the same operation is repeated and the data 966a are read word by word out of the image memory 902 to be stored in the first FIFO 912. And, when the first FIFO 912 is fulfilled, the first FIFO controller 413 stops to output the image memory access requests 968.

When a desired video image is displayed on the display, a user, intending to capture the video data, indicates data capturing to the personal computer.

By the indication, the personal computer delivers a read request 970 periodically with a predetermined cycle, on condition that the select signal 911c is indicating the selection of the pair of the data 966a read out of the image memory 902 and their write request signal 966b.

With each read request 970, the first FIFO controller 913 in the write buffer 901 outputs a FIFO control signal 967 for reading out a word of data 963 of a word to be output to the personal computer. Here, when the select signal 911c is indicating the selection of the pair of video data 962a and their write request signal 962b, the first FIFO controller 913 dispatch the wait signal 471 to make the personal computer waiting.

FIG. 12 is a time chart illustrating the arbitration between the write request of the video data 962a into the image memory 902 and the data readout of the overlay data 976, wherein active states of the video data write request signal 962b, the image memory access requests 981 from the overlay section 905 and the memory access permission signal 974 are expressed by low levels. Periods denoted by G0 to G9 represent time periods where the overlay data 976 are read out, and periods denoted by C0 to C9 represent time periods where write actions for the video data 962a are performed.

As heretofore described, in a memory access controller of the present invention, data flowing in continuously can be written into a image memory without lack and they can be read out of the image memory continuously without lack even when a low cost single port RAM is applied for the image memory, since it comprises;

- a write buffer for storing temporarily data flowing in continuously and outputting write requests while data are stored therein,
- a read buffer for storing temporarily data output from the image memory to be read out therefrom continuously, and
- an arbiter section for arbitrating concurrence between write requests and read requests for the image memory, writing data stored in the write buffer at a speed higher than a speed of data writing into the write buffer when write actions are performed according to the write requests, and reading data out of the image memory to be stored in the read buffer at a speed higher than a speed of data readout from the read buffer when read actions are performed according to the read requests.

What is claimed is:

1. A memory access controller comprising:
   an image memory consisting of a single port RAM;
   a write buffer for storing temporarily data flowing in continuously and outputting write requests for said image memory when data are rest stored therein;
   a read buffer for storing temporarily data output from said image memory to be read out therefrom continuously; and
   an arbiter section for arbitrating concurrence between said write requests from said write buffer and read requests for said image memory generated when data rest stored in said read buffer are lesser than a predetermined level, writing data stored in and read out of said write buffer into said image memory at a speed higher than a speed of data input into said write buffer when write actions for said image memory are performed according to said write requests, and reading a fixed volume of data to be stored in said read buffer out of said image memory at a speed higher than a speed of data readout from said read buffer when read actions for said image memory are performed according to said read requests.

2. A memory access controller recited in claim 1, wherein said image memory consists of a single port SRAM.

3. A memory access controller comprising:
   an image memory consisting of a single port DRAM;
   a write buffer for storing temporarily data flowing in continuously and outputting write requests for said image memory when data are rest stored therein;
   a read buffer for storing temporarily data output from said image memory to be read out therefrom continuously; and
   an arbiter section for arbitrating concurrence among said write requests from said write buffer, requests for refreshment of said image memory, and read requests for said image memory generated when data rest stored in said read buffer are lesser than a predetermined level, writing data stored in and read out of said write buffer into said image memory at a speed higher than a speed of data input into said write buffer when write actions for said image memory are performed according to said write requests, and reading a fixed volume of data to be stored in said read buffer out of said image memory at a speed higher than a speed of data readout from said read buffer when read actions for said image memory are performed according to said read requests.

4. A memory access controller recited in claim 3, wherein said write buffer comprises:
   a selector for selecting a flow of data among data flowing in from at least two devices;
   a first FIFO for storing temporarily data of said flow selected by said selector; and
   a first FIFO controller for controlling data read-write of said first FIFO and outputting said write requests when data are rest stored in said first FIFO.

5. A memory access controller recited in claim 3, wherein said read buffer comprises:
   a second FIFO for storing temporarily data read out of said image memory; and
   a second FIFO controller for controlling data read-write of said second FIFO.

6. A memory access controller recited in claim 3, wherein said arbiter section comprises:
   a refresh request section for outputting said requests for refreshment of said image memory;
   a sequencer for generating memory control signals for controlling said image memory arbitrating concurrence among said requests for refreshment from said refresh request section, said read requests and said write requests;
   a first address generator for outputting address data of said image memory used when said write actions are performed;
   a second address generator for outputting address data of said image memory used when said read actions are performed; and
   an address selector for selecting address data generated by either of said first or said second address generator.

7. A memory access controller recited in claim 3, wherein said arbiter section comprises:
   a refresh request section for outputting said requests for refreshment of said image memory;
   a second sequencer for outputting memory control signals for controlling said image memory arbitrating concurrence between said requests for refreshment from said refresh request section and said read requests, and outputting an image memory access permission signal when there is no request for refreshment nor read request;
   a first sequencer for outputting memory control signals for controlling said image memory on condition that said image memory access permission signal is output from said second sequencer;
   a first address generator for outputting address data of said image memory used when said write actions are performed;

a second address generator for outputting address data of said image memory used when said read actions are performed; and a selector for selecting, as a pair to be delivered to said image memory, either a pair of said memory control signals output from said first sequencer and address data generated by said first address generator or a pair of said memory control signals output from said second sequencer and address data generated by said second address generator.

* * * * *